United States Patent
Lee et al.

(10) Patent No.: US 12,252,623 B2
(45) Date of Patent: Mar. 18, 2025

(54) BIO-PAINT COMPOSITION HAVING IMPROVED HYDROLYSIS RESISTANCE AND METHOD OF PREPARING SAME

(71) Applicants: HYUNDAI MOTOR COMPANY, Seoul (KR); KIA CORPORATION, Seoul (KR); NOROO BEE CHEMICAL CO., LTD., Cheonan-si (KR)

(72) Inventors: Ji Won Lee, Seoul (KR); Jae Beom Ahn, Anyang-si (KR); Soon Gi Kim, Cheonan-si (KR); Sung Kyu Lee, Cheonan-si (KR)

(73) Assignees: Hyundai Motor Company, Seoul (KR); Kia Corporation, Seoul (KR); Noroo Automotive Coatings Co., Ltd., Hwaseong-si (KR)

( * ) Notice: Subject to any disclaimer, the term of this patent is extended or adjusted under 35 U.S.C. 154(b) by 470 days.

(21) Appl. No.: 17/546,864

(22) Filed: Dec. 9, 2021

(65) Prior Publication Data
US 2022/0356368 A1    Nov. 10, 2022

(30) Foreign Application Priority Data
Apr. 21, 2021    (KR) .......................... 10-2021-0051609

(51) Int. Cl.
| | | |
|---|---|---|
| *C08F 220/40* | (2006.01) | |
| *C08G 18/40* | (2006.01) | |
| *C08G 18/42* | (2006.01) | |
| *C08G 18/48* | (2006.01) | |
| *C08G 18/75* | (2006.01) | |
| *C08L 33/12* | (2006.01) | |
| *C09D 133/12* | (2006.01) | |

(52) U.S. Cl.
CPC .......... *C09D 133/12* (2013.01); *C08F 220/40* (2013.01); *C08G 18/4018* (2013.01); *C08G 18/42* (2013.01); *C08G 18/4829* (2013.01); *C08G 18/755* (2013.01); *C08L 33/12* (2013.01); *C08L 2205/03* (2013.01)

(58) Field of Classification Search
CPC ..... C08F 220/40; C09D 133/12; C08L 33/12; C08L 2205/03; C08G 18/4018; C08G 18/42; C08G 18/4829; C08G 18/755
USPC ......................................................... 524/507
See application file for complete search history.

(56) References Cited

U.S. PATENT DOCUMENTS

2007/0287777 A1 * 12/2007 Kawamura .......... C09D 175/04
524/589

FOREIGN PATENT DOCUMENTS

| JP | 2008-013744 A | 1/2008 |
|---|---|---|
| KR | 10-2014-0021101 A | 2/2014 |
| KR | 10-2015-0139209 A | 12/2015 |
| KR | 20150139209 A * | 12/2015 |

* cited by examiner

*Primary Examiner* — Kelechi C Egwim
(74) *Attorney, Agent, or Firm* — Morgan, Lewis & Bockius LLP

(57) ABSTRACT

A bio-paint composition and a method of preparing the same can improve the physical properties of a paint by adding acrylic resins having a new composition when the paint composition containing a biomass polyurethane which is an eco-friendly material is prepared.

18 Claims, No Drawings

BIO-PAINT COMPOSITION HAVING IMPROVED HYDROLYSIS RESISTANCE AND METHOD OF PREPARING SAME

CROSS REFERENCE TO RELATED APPLICATION

The present application claims the benefit of priority to Korean Patent Application No. 10-2021-0051609, filed on Apr. 21, 2021 in the Korean Intellectual Property Office, the entire contents of which is incorporated herein for all purposes by reference.

TECHNICAL FIELD

The present disclosure relates to a bio-paint composition and a method of preparing the same. More particularly, the present disclosure relates to a paint composition containing a biomass polyurethane that is an eco-friendly material and a method of preparing the bio-paint composition, the method adding an acrylic resin as a new ingredient to improve the physical properties of a paint when preparing the paint composition containing a biomass polyurethane that is an eco-friendly material.

BACKGROUND

As interest in the environment increases, many efforts are being made in various fields to reduce carbon dioxide which has been blamed for global warming. For this reason, much attention has been paid to biomass as an alternative to existing resources such as oil and coal.

Biomass does not increase the amount of carbon dioxide in the air because the net life-cycle emission of carbon dioxide on the earth is zero. In addition, the use of biomass is an inevitable choice not only due to environmental issues but also due to petroleum resources which will soon be depleted.

In developed countries, biomass is widely used in the food industry, paper industry, etc. and has a variety of applications such as food containers, packaging materials, and agricultural films. In recent years, biomass resins have been increasingly synthesized for application in paints. Especially, with the development of eco-friendly vehicles such as electric vehicles, applications in automotive paints have increased to meet the need for eco-friendly materials that can boost the eco-friendly vehicle concept. However, since requirements for the physical properties of automotive components are becoming more demanding, it is difficult to apply existing paints synthesized from biomass resins to automotive components as they are.

For example, since biomass contains ester structures, there is a problem in that biomass-based paints suffer deterioration in hydrolysis resistance. This results in the surfaces of painted automotive components being sticky and being easily scratched.

SUMMARY OF THE DISCLOSURE

Accordingly, the present disclosure has been made keeping in mind the problems occurring in the related art, and an objective of the present disclosure is to provide an optimal paint composition capable of securing good hydrolysis resistance while using biomass polyurethane resins.

Another objective of the present disclosure is to provide a paint composition that has a good hydrolysis resistance and can satisfy more demanding requirements for physical properties of automotive components including interior parts as well as exterior parts.

The objectives of the present disclosure are not limited to the ones mentioned above. The objectives of the present disclosure will become more apparent from the following description and will be achieved by means described in the claims, and combinations thereof.

According to one exemplary embodiment of the present disclosure, a bio-paint composition may include: biomass polyurethanes; acrylic resins; and additives, in which the acrylic resins include a first acrylic resin having a hydroxyl content of 2% to 3% and a glass transition temperature of 85° C. to 90° C.; and a second acrylic resin having a hydroxyl content of 3% to 4% and a glass transition temperature of 80° C. to 85° C.

The biomass polyurethanes may have a weight average molecular weight of 40,000 to 43,000 g/mol, a hydroxyl value of 100 to 200 mg KOH/g, a hydroxyl content of 6% to 8%, and a glass transition temperature of −32° C. to 30° C.

The acrylic resins may have an acid value of 0.05 mg KOH/g or less.

The acrylic resins may be prepared by radical polymerization, in a solvent, of a radical initiator and at least one monomer selected from among methacrylic monomers having an aliphatic group, acrylic monomers having an aliphatic group, acrylic monomers having an aromatic group, methacrylic monomers having an alicyclic group, acrylic monomers having an alicyclic group, acrylic monomers having a hydroxyl group, or methacrylic monomers having a hydroxyl group.

The methacrylic monomers having the aliphatic group may include one selected from the group consisting of butyl methacrylate, methyl methacrylate, ethyl methacrylate, 2-ethylhexyl methacrylate, lauryl methacrylate, hydroxyethyl methacrylate, and combinations thereof. The acrylic monomers having the aliphatic group may include one selected from the group consisting of butyl acrylate, ethyl acrylate, and combinations thereof, the acrylic monomers having alicyclic groups may include one selected from the group consisting of 2-ethylhexyl acrylate, iso-bornyl acrylate, tri-methyl cyclohexyl acrylate, and combinations thereof. The methacrylic monomers having the alicyclic group may include one selected from the group consisting of iso-bornyl methacrylate, cyclohexyl methacrylate, and combinations thereof. The acrylic monomers having the aromatic group may include styrene monomers. The methacrylic monomers having the hydroxyl group may include one selected from the group consisting of methacrylic acid, acrylic acid, 2-hydroxyethyl methacrylate, and combinations thereof.

The first acrylic resin may include compounds represented by Formula 1:

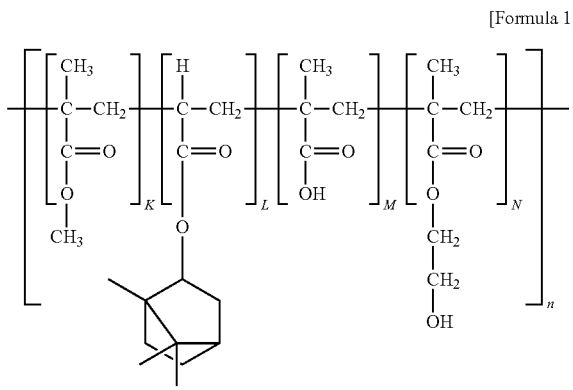

[Formula 1]

wherein each of K, L, M and N indicates an integer between 0 and 10, and n indicates an integer of 1 or greater.

The second acrylic resin may include compounds represented by Formula 2:

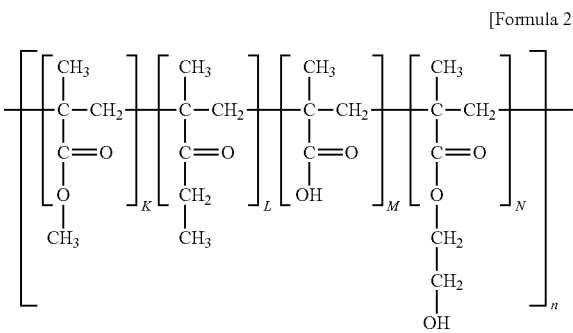

[Formula 2]

Here, each of K, L, M and N indicates an integer between 0 and 10, and n indicates an integer of 1 or greater.

The additives may include one selected from the group consisting of reaction catalysts, quenchers, anti-settling agents, wetting additives, UV absorbers, solvents, pigments, and combinations thereof.

The additives may include reaction catalysts, quenchers, anti-settling agents, wetting additives, UV absorbers, solvents and pigments.

The bio-paint composition may include 15% to 25% by weight of the biomass polyurethanes; 30% to 60% by weight of the acrylic resins; and 19% to 47% by weight of the additives.

The bio-paint composition may include 15% to 25% by weight of the biomass polyurethanes; 25% to 45% by weight of the first acrylic resins; 5% to 15% by weight of the second acrylic resins; and 19% to 47% by weight of the additives.

The bio-paint composition may include 15% to 25% by weight of the biomass polyurethanes; 25% to 45% by weight of the first acrylic resins; 5% to 15% by weight of the second acrylic resins; 1% to 2% by weight of the pigments; 0.1% to 1.5% by weight of the reaction catalysts; 1.5% to 3.5% by weight of the quenchers; 5.0% to 10.0% by weight of the anti-settling agents; 0.1% to 0.5% by weight of the wetting additives; 1.0% to 2.0% by weight of the UV absorbers; and 10% to 25% by weight of the solvents.

According to one exemplary embodiment of the present disclosure, there is provided a method of preparing a bio-paint composition, the method including: preparing acrylic resins; preparing biomass polyurethanes; and preparing a paint composition by mixing the acrylic resins, the biomass polyurethanes, and the additives. The acrylic resins may include a first acrylic resin having a hydroxyl content of 2% to 3% and a glass transition temperature of 85° C. to 90° C. and a second acrylic resin having a hydroxyl content of 3% to 4% and a glass transition temperature of 80° C. to 85° C.

The preparing of the biomass polyurethanes may include preparing a mixed solution by adding the acrylic resins and isocyanates to an organic solvent; and synthesizing the biomass polyurethanes by adding bio polyols to the mixed solution.

The first acrylic resin may be prepared by adding the first monomers including the methacrylic monomers having aliphatic groups, the acrylic monomers having alicyclic groups, the methacrylic monomers having hydroxyl groups, and the radical initiators into the solvents, followed by radical polymerization of them.

The first monomers may include methyl methacrylate, iso-bornyl acrylate, methacrylic acid and 2-hydroxyethyl methacrylate.

The second acrylic resins may be prepared by adding the second monomers including the methacrylic monomers having aliphatic groups, the methacrylic monomers having hydroxyl groups, and the acrylic monomers having hydroxyl groups, and radical initiators into the solvents, followed by radical polymerization of them.

The second monomers may include methyl methacrylate, ethyl methacrylate, acrylic acid, and 2-hydroxyethyl methacrylate.

According to one exemplary embodiment of the present disclosure, it is possible to provide an optimal paint composition capable of securing excellent hydrolysis resistance using the biomass polyurethane resins.

According to one exemplary embodiment of the present disclosure, it is possible to provide a paint composition that has good hydrolysis resistance and can satisfy more rigid requirements for physical properties of automotive components including exterior parts as well as interior parts.

The effects of the present disclosure are not limited to the above-mentioned ones, and it should be understood that the effects of the present disclosure include all effects that can be inferred from the following description.

DESCRIPTION OF THE PREFERRED EMBODIMENTS

The above objectives, other objectives, features and advantages of the present disclosure will be easily understood from the following preferred embodiments with reference to the accompanying drawings. However, the present disclosure is not limited to the embodiments described herein and may be embodied in other forms. Rather, the embodiments disclosed herein are provided so that the disclosures may become thorough and complete, and the spirit of the present disclosure may be sufficiently delivered to those skilled in the art.

In the present specification, it is to be understood that terms such as "include" or "have" are intended to specify the presence of features, numbers, steps, actions, components, parts, or combinations thereof described in the specification, and not to exclude previously the possibility of the presence or addition of one or more other features, numbers, steps, actions, components, parts, or combinations thereof. In addition, when parts such as layers, films, regions, plates are said to be "on" other parts, this includes not only the case where the parts are "directly on" the other parts, but also the case where there are intervening parts therebetween. Similarly, when parts such as layers, films, regions, or plates are said to be "under" other parts, this includes not only the case where the parts are "directly under", but also the case where there are intervening parts therebetween.

Unless otherwise specified, all numbers, values, and/or expressions describing quantities of ingredients, reaction conditions, polymer compositions, and formulations used herein are approximations that reflect various uncertainties of measurements occurring in obtaining these values, among other things essentially, so these should be understood as being modified by the term "about" in all cases. In addition, when numerical ranges are disclosed herein, such ranges are continuous and, unless otherwise indicated, include all values from the minimum value to the maximum value including the maximum value within these ranges. Furthermore, where this range refers to an integer, unless otherwise indicated, all integers from the minimum value to the maximum value including the maximum value are included.

In this specification, where a range is described for a variable, it will be understood that the variable includes all values within the stated range, including stated endpoints of the range. For example, a range of "5 to 10" includes values of 5, 6, 7, 8, 9, and 10, as well as any subranges such as 6 to 10, 7 to 10, 6 to 9, 7 to 9, and it will be understood to include any values between integers that are reasonable in the scope of the stated range, such as 5.5, 6.5, 7.5, 5.5 to 8.5 and 6.5 to 9. In addition, for example, it will be understood that a range of "10 to 30%" includes all integers including 10%, 11%, 12%, 13%, etc. and all integers up to 30%, as well as any subranges, such as 10 to 15%, 12 to 18% and 20 to 30%, etc., and also includes any value between reasonable integers within the scope of the stated range, such as 10.5%, 15.5%, 25.5%, etc.

The present disclosure relates to a bio-paint composition and a method of preparing the bio-paint composition.

Hereinafter, a bio-paint composition of the present disclosure will be described, and then a preparation method thereof will be described step by step.

Bio-Paint Composition

The bio-paint composition according to one exemplary embodiment of the present disclosure contains biomass polyurethanes, acrylic resins, and additives.

Biomass Polyurethanes

The biomass polyurethanes are used as main resins to determine the content of bio-based materials.

The biomass polyurethanes have a weight average molecular weight of 40,000 to 43,000 g/mol, a hydroxyl value of 100 to 200 mg KOH/g, a hydroxyl content of 6% to 8%, and a glass transition temperature Tg of −32° C. to 30° C.

The bio-paint composition of the present disclosure may include 15% to 25% by weight of the biomass polyurethanes. When the weight of the biomass polyurethanes is less than 15% by weight, the requirements for the properties of a bio-paint cannot be satisfied. On the other hand, when it exceeds 25% by weight, a paint film hardness is lowered, resulting in the surface of the paint film being sticky and being easily scratched.

Acrylic Resins

In the present disclosure, the acrylic resins may be prepared by radical polymerization of at least one monomer of methacrylic monomers having aliphatic groups, acrylic monomers having aliphatic groups, acrylic monomers having aromatic groups, methacrylic monomers having alicyclic groups, acrylic monomers having alicyclic groups, acrylic monomers having hydroxyl groups, or methacrylic monomers having hydroxyl groups, and radical initiators in solvents.

The methacrylic monomers having aliphatic groups include one selected from the group consisting of butyl methacrylate, methyl methacrylate, ethyl methacrylate, 2-ethylhexyl methacrylate, lauryl methacrylate, hydroxyethyl methacrylate, and combinations thereof.

The acrylic monomers having aliphatic groups include one selected from the group consisting of butyl acrylate, ethyl acrylate, and combinations thereof.

The acrylic monomers having alicyclic groups include one selected from the group consisting of 2-ethylhexyl acrylate, iso-bornyl acrylate, trimethyl cyclohexyl acrylate, and combinations thereof.

The methacrylic monomers having alicyclic groups include one selected from the group consisting of iso-bornyl methacrylate, cyclohexyl methacrylate, and combinations thereof.

The acrylic monomers having aromatic groups include styrene monomers.

The methacrylic monomers having hydroxyl groups include one selected from the group consisting of methacrylic acid, acrylic acid, and combinations thereof.

The acrylic resins of the present disclosure preferably include the first acrylic resins and the second acrylic resins.

The first acrylic resins preferably have an acid value of 0.05 mg KOH/g or less, a hydroxyl content of 2% to 3%, a glass transition temperature of 85° C. to 90° C., and a weight average molecular weight of 35,000 to 40,000 g/mol.

More preferably, the first acrylic resins may include compounds represented by Formula 1:

[Formula 1]

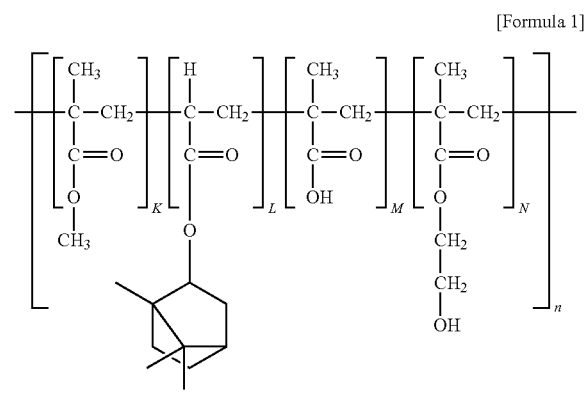

Here, each of K, L, M and N indicates an integer between 0 and 10, and n indicates an integer of 1 or greater.

The second acrylic resins preferably have an acid value of 0.05 mg KOH/g or less, a hydroxyl content of 3% to 4%, a glass transition temperature of 80° C. to 85° C., and a weight average molecular weight of 20,000 to 25,000 g/mol.

More preferably, the second acrylic resins may include compounds represented by Formula 2:

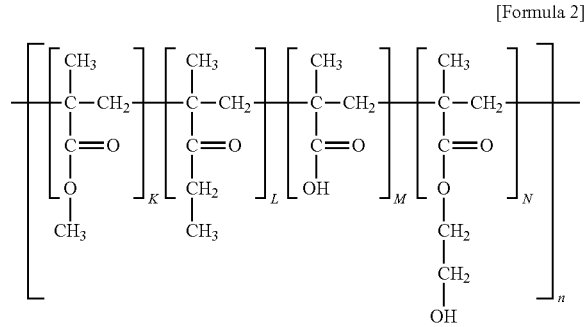

Here, each of K, L, M and N indicates an integer between 0 and 10, and n indicates an integer of 1 or greater.

The bio-paint composition of the present disclosure contains 30% to 60% by weight of the acrylic resins. More particularly, the bio-paint composition preferably includes 25% to 45% by weight of the first acrylic resins, and 5% to 15% by weight of the second acrylic resins. In this case, when the content of the first acrylic resins is less than 25% by weight, adhesion may decrease after reliability test. On the other hand, when it exceeds 45% by weight, the quality of paint appearance may be deteriorated. When the content of the second acrylic resins is less than 5% by weight, a paint film may locally swell. On the other hand, when it exceeds 15% by weight, paint appearance may be deteriorated.

Additives

The bio-paint composition of the present disclosure may further include additives to change or impart properties or special features of a paint.

The additives include at least one selected from the group consisting of reaction catalysts, quenchers, anti-settling agents, wetting additives, UV absorbers, solvents, pigments, and combinations thereof, and preferably include reaction catalysts, quenchers, anti-settling agents, wetting additives, UV absorbers, solvents, and pigments.

The bio-paint composition of the present disclosure preferably includes 19% to 47% by weight of the additives. More particularly, the bio-paint composition of the present disclosure includes 1% to 2% by weight of pigments, 0.1% to 1.5% by weight of reaction catalysts, 1.5% to 3.5% by weight of quenchers, 5.0% to 10.0% by weight of anti-settling agents, 0.1% to 0.5% by weight of wetting additives, 1.0% to 2.0% by weight of UV absorbers, and 10% to 25% by weight of solvents.

Preparation of Bio-Paint Composition

The method of preparing a bio-paint composition, according to one exemplary embodiment of the present disclosure, includes: preparing acrylic resins, preparing biomass polyurethanes, and mixing the acrylic resins, the biomass polyurethanes, and the additives to obtain a bio-paint composition.

Hereinafter, each step will be described in more detail.

However, we will exclude as much as possible the disclosures overlapping with the disclosures with respect to the bio-paint composition previously described.

Preparation of Acrylic Resin

In the present disclosure, the acrylic resins are prepared by radical polymerization of at least one monomer of methacrylic monomers or acrylic monomers, and a radical initiator in a solvent.

The acrylic resins may be polymerized from 98% to 99.9% by weight of monomers and 0.1% to 2% by weight of radical initiators.

The acrylic resins of the present disclosure may preferably include the first acrylic resins and the second acrylic resins.

The first acrylic resins may be prepared by adding the first monomers including methacrylic monomers having aliphatic groups, acrylic monomers having alicyclic groups, and methacrylic monomers having hydroxyl groups, and radical initiators into solvents, followed by radical polymerizing them. In this case, the polymerization is preferably carried out at 100° C. to 140° C.

The first monomers include methyl methacrylate, iso-bornyl acrylate, methacrylic acid and 2-hydroxyethyl methacrylate, preferably include 50% to 80% by weight of methyl methacrylate, 5% to 15% by weight of iso-bornyl acrylate, 0.5% to 5% by weight of methacrylic acid and 10 to 25% by weight of 2-hydroxyethyl methacrylate. More preferably, the first monomers include 65% to 75% by weight of methyl methacrylate, 5% to 15% by weight of iso-bornyl acrylate, 0.5% to 2% by weight of methacrylic acid, and 15% to 20% by weight of 2-hydroxyethyl methacrylate.

The first acrylic resins preferably have an acid value of 0.05 mg KOH/g or less, a hydroxyl content of 2% to 3%, a glass transition temperature of 85° C. to 90° C., and a weight average molecular weight of 35,000 to 40,000 g/mol.

It is more preferable that the first acrylic resins include compounds represented by Formula 1:

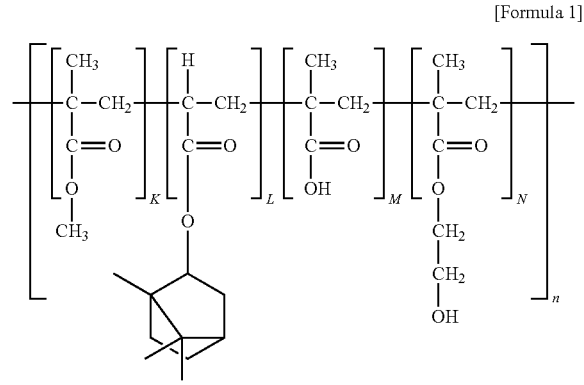

Here, each of K, L, M and N indicates an integer between 0 and 10, and n indicates an integer between 10 to 2,000.

The second acrylic resins may be manufactured by adding the second monomer including methacrylic monomers having aliphatic groups, the methacrylic monomers having hydroxyl groups, and the acrylic monomers having hydroxyl groups, and the radical initiators into solvents, followed by radical polymerizing them. In this case, the polymerization is preferably carried out at 100° C. to 140° C.

The second monomers include methyl methacrylate, ethyl methacrylate, acrylic acid and 2-hydroxyethyl methacrylate, and preferably include 50% to 80% by weight of methyl methacrylate, 10% to 25% by weight of ethyl methacrylate, 0.5% to 5% by weight of acrylic acid and 5% to 20% by weight of 2-hydroxyethyl methacrylate. More preferably, the second monomers include 65% to 75% by weight of methyl methacrylate, 15 to 20% by weight of ethyl methacrylate, 0.5% to 2% by weight of acrylic acid, and 5% to 15% by weight of 2-hydroxyethyl methacrylate.

The second acrylic resins preferably have an acid value of 0.05 mg KOH/g or less, a hydroxyl content of 3% to 4%, a glass transition temperature of 80° C. to 85° C., and a weight average molecular weight of 30,000 to 60,000 g/mol.

It is more preferable that the second acrylic resins include compounds represented by Formula 2:

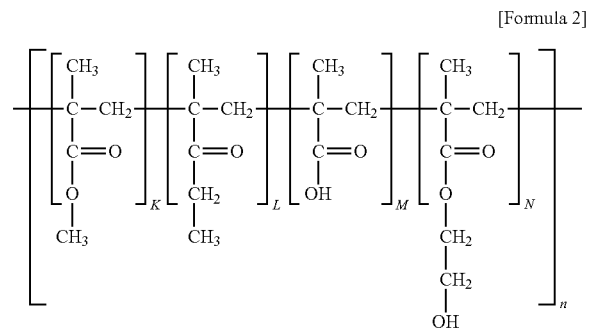

[Formula 2]

Here, each of K, L, M and N indicates integers between 0 and 10, and n indicates integers between 10 to 2,000.

The radical initiators used in the synthesis of the first acrylic resins and the second acrylic resins include any one of benzoyl peroxide (BPO) and azo-bis-isobutyronitrile (AIBN).

The solvents used in the synthesis of the first acrylic resins and the second acrylic resins may be selected from among esters such as normal butyl acetates, ethylene glycol ethyl ether acetate, and ketones such as methyl isobutyl ketone and methyl normal amyl ketone and may be used in the present disclosure.

Preparation of Biomass Polyurethanes

The step of preparing biomass polyurethanes according to one exemplary embodiment of the present disclosure may include preparing a mixed solution by adding acrylic resins and isocyanates into an organic solvent, followed by synthesizing the biomass polyurethanes by adding bio polyols to the mixed solution. In particular, after preparing the mixed solution by reacting the acrylic resins having hydroxyl groups and the isocyanates, the biomass polyurethanes may be synthesized by adding plant-derived bio polyols into the mixed solution.

Preferably, 10 to 50 parts by weight of isocyanates based on 100 parts by weight of the acrylic resins may be added to prepare the mixed solution, and then 10 to 100 parts by weight of bio polyols based on 100 parts by weight of the mixed solution may be added to the mixed solution to synthesize the biomass polyurethanes.

The isocyanates include one selected from the group consisting of hexamethylene diisocyanate, isophorone diisocyanate, dicyclohexylmethane diisocyanate, and combinations thereof.

The bio polyols can be synthesized from animal and plant oils derived from biomass resources that do not have hydroxyl groups. The synthesis may be carried out by: (1) epoxidation and ring opening reaction by which carbon double bonds of unsaturated fatty acid chains of animal and plant oils are modified and then hydroxyl groups are introduced into the unsaturated fatty acid chains; (2) hydroformylation (similar to epoxidation) and hydrogenation by which the carbon double bonds are modified and hydroxyl groups are introduced; and (3) ozonolysis by which carbon double bonds are cut by ozone (O3) and hydroxyl groups are then introduced through hydrogen addition.

In the present disclosure, it is preferable to use bio polyols prepared by ozonolysis. It is advantageous that the bio polyols used to prepare the biomass polyurethane resins of the present disclosure have a weight average molecular weight in a range of 500 to 10,000 in terms of chemical resistance and productivity. More preferably, the bio polyols have a weight average molecular weight in a range of 1,000 to 5,000.

In addition, it is preferable that the bio polyols have 2 to 8 hydroxyl functional groups.

The organic solvent is selected from any one of esters such as normal butyl acetate, ethylene glycol ethyl ether acetate, and ketones such as methyl isobutyl ketone and methyl normal amyl ketone and is used in the present disclosure.

Preparation of Paint Composition

This is the step of preparing the paint composition of the present disclosure by mixing acrylic resins, biomass polyurethanes, and additives.

The paint composition is preferably prepared by mixing 15% to 25% by weight of the biomass polyurethanes, 30% to 60% by weight of the acrylic resins, and 19% to 47% by weight of the additives, and more preferably, may be prepared by mixing 15% to 25% by weight of the biomass polyurethanes, and 25% to 45% by weight of the first acrylic resins, 5% to 15% by weight of the second acrylic resins, and 19% to 47% by weight of the additives.

The paint composition of the present disclosure may further include a curing agent. The curing agent is included in 20 parts by weight based on 100 parts by weight of the paint composition.

It is preferable to select hexamethylene diisocyanate trimers as the curing agent in consideration of no yellowing and weather resistance.

Hereinafter, the present disclosure will be described in more detail through specific examples. However, these examples are for illustrative purposes only, and the scope of the present disclosure is not limited thereto.

Preparation Example 1 (Biomass Polyurethanes)

A thermometer, a condenser, a stirrer, a nitrogen inlet, and a heater were attached to a four-necked flask. In the flask, methyl isobutyl ketone and butyl acetate were mixed in a weight ratio of 1:2 to obtain an organic solvent. 100 parts by weight of acrylic resin and 0.05 parts by weight of dibutyltin laurate based on 100 parts by weight of the organic solvent were added, and nitrogen was introduced thereinto while stirring, followed by heating the reactants up to 80° C. Then, 33 parts by weight of iso phorone diisocyanate based on 100 parts by weight of the acrylic resin were added dropwise at a uniform rate for 1 hour to obtain a mixed solution. Then, after holding the contents in the flask for 1 hour, Petronas' DVP R200 (bio polyols) prepared by ozonolysis was added to be 20 parts by weight based on 100 parts by weight of the mixed solution and reacted for 1 hour. After that, 0.05 parts by weight of dibutyltin laurate based on 100 parts by weight of the organic solvent was added three times at intervals of 1 hour and reacted for 2 hours to obtain biomass polyurethanes. The obtained biomass polyurethane having hydroxyl groups were found to have a weight average molecular weight of 40,000 to 43,000 g/mol, a glass transition temperature of −32° C. to 30° C., and a hydroxyl value of 151 mg KOH/g.

Preparation Example 2 (First Acrylic Resins)

After introducing 490 g of normal butyl acetate, as a solvent, into a four-necked flask equipped with a stirrer, it was replaced with nitrogen gas. Then, the temperature was raised to 120° C. while stirring the contents in the flask, and was maintained constant. After that, a mixture of 70 g of iso-bornyl acrylate as an acrylic monomer having an alicyclic group, 490 g of methyl methacrylate as a methacrylic monomer having an aliphatic group, 133 g of 2-hydroxyethyl methacrylate as a methacrylic monomer having a hydroxyl group, 7 g of methacrylic acid as a methacrylic monomer having a carboxyl group, and 28 g of tertiary butylperoxy-2-ethylhexanoates as an initiator was added dropwise into a solvent over 4 hours at a uniform rate. After completion of the adding, the mixture was further aged at a reaction temperature of 120° C. for 1 hour, and then a solution of 2 g of tertiary amylperoxy-2-ethylhexanoate dissolved in 21 g of normal butyl acetate was added. Unreacted monomers were reacted with the solution, and the solution was further stirred for 2 hours, followed by diluting with 161 g of normal butyl acetate to prepare the first acrylic resin.

Preparation Example 3 (Second Acrylic Resins)

After introducing 420 g of normal butyl acetates, as a solvent, into a four-necked flask equipped with a stirrer, it was replaced with nitrogen gas. Then, the temperature was raised to 120° C. while stirring the contents in the flask, and was maintained constant. After that, a mixture of 490 g of methyl methacrylate as a methacrylic monomer having an aliphatic group, 133 g of ethyl methacrylate, 70 g of 2-hydroxyethyl methacrylate as a methacrylic monomer having a hydroxyl group, 7 g of acrylic acid as a methacrylic monomer having a carboxyl group, 14 g of tertiary butylperoxy-2-ethylhexanoate as an initiator was added dropwise into a solvent at a uniform rate over 3 hours. After completion of adding, the mixture was further aged at a reaction temperature of 120° C. for 1 hour, and then 2 g of tertiary amylperoxy-2-ethylhexanoate was added to a solution dissolved in 21 g of normal butyl acetates. Unreacted monomers were reacted with the solution, and the solution was further stirred for 2 hours, followed by diluting with 231 g of normal butyl acetate to prepare the second acrylic resin.

Example 1

20% by weight of the biomass polyurethane prepared in Preparation Examples 1 and 2, 45% by weight of the first acrylic resin, and 15% by weight of the second acrylic resin were mixed with additives (5% pigment, 0.5% reaction catalyst, 3% quencher, 3% anti-settling agent, 0.5% wetting additive, 1% UV absorber, 7% solvent) to prepare the paint composition. Thereafter, based on 100 parts by weight of the paint composition, 25 parts by weight of a curing agent including a hexamethylene diisocyanate trimer was used to paint specimens and cured at 80° C. for 30 minutes to prepare a paint film formed from the paint composition.

Comparative Example 1 to Comparative Example 6

The paint films were prepared using paint compositions having the contents under conditions shown in Table 1.

TABLE 1

| | Biomass poly-urethane | First acrylic resin | Second acrylic resin | Additives | | | | | | |
|---|---|---|---|---|---|---|---|---|---|---|
| | | | | Pigment | Reaction catalyst | Quencher | Anti-settling agent | wetting additive | UV absorber | Solvent |
| Example 1 | 20 | 45 | 15 | 5 | 0.5 | 3 | 3 | 0.5 | 1 | 7 |
| Comparative example 1 | 30 | 45 | 5 | 5 | 0.5 | 3 | 3 | 0.5 | 1 | 7 |
| Comparative example 2 | 30 | 25 | 25 | 5 | 0.5 | 3 | 3 | 0.5 | 1 | 7 |
| Comparative example 3 | 20 | 60 | 0 | 5 | 0.5 | 3 | 3 | 0.5 | 1 | 7 |
| Comparative example 4 | 20 | 0 | 60 | 5 | 0.5 | 3 | 3 | 0.5 | 1 | 7 |
| Comparative example 5 | 10 | 45 | 25 | 5 | 0.5 | 3 | 3 | 0.5 | 1 | 7 |
| Comparative example 6 | 10 | 20 | 50 | 5 | 0.5 | 3 | 3 | 0.5 | 1 | 7 |

Experimental Example (Evaluation of Physical (Properties) The physical properties of the paint films of the Examples and Comparative Examples were evaluated through the following measuring methods, and the results are shown in Table 2 below.

Measuring Method

Biomass content measurement: ASTM D6866 (determination of bio content by detecting C14 which does not exist in petroleum sources) Sunscreen resistance: Check the appearance and adhesion after applying 0.25 g of sunscreen to a white cotton cloth, the applied part was adhered to the surface of the paint film, and was held at 80° C. for 60 minutes.

Heat-resistance cycle: Check the appearance and adhesion after removing moisture from the painted specimen that has been exposed to heat and humidity in a certain cycling condition according to the specified standard.

Moisture resistance: Check the appearance and adhesion after removing moisture from the painted specimen that has been held under the condition of 50° C. and 168 hrs.

Hydrolysis resistance: Check adhesion, scratching, and the degree of discoloration after being held at 90° C. and 95% humidity, and for 168 hours.

Light-fastness: Check appearance and adhesion after Xenon arco irradiation at 1050 KJ/m2 (340 nm) or 126 MJ/m2 (300~400 nm) as specified in SAE J 2412.

TABLE 2

| | Theoretical biomass content | Sunscreen resistance | Heat-Resistance cycle | Moisture resistance | Hydrolysis resistance | Light-fastness |
|---|---|---|---|---|---|---|
| Example 1 | 14 | OK (M 1.5) | OK (M 1.5) | OK (M 1.5) | OK (M 2.0) | OK (M 1.5) |
| Comparative example 1 | 21 | N.G (M 3.0) | N.G (M 3.0) | N.G (M 3.0) | N.G (M 5.0) | N.G (M 4.0) |
| Comparative example 2 | 21 | OK (M 2.0) | OK (M 1.5) | N.G (M 3.0) | N.G (M 4.0) | N.G (M 4.0) |
| Comparative example 3 | 14 | N.G (M 3.0) | OK (M 2.5) | OK (M 2.5) | OK (M 2.5) | OK (M 2.5) |
| Comparative example 4 | 14 | OK (M 1.5) | OK (M 1.5) | OK (M 1.5) | N.G (M 3.0) | OK (M 3.5) |
| Comparative example 5 | 7 | OK (M 2.0) | OK (M 1.5) | OK (M 1.5) | N.G (M 3.0) | OK (M 2.5) |
| Comparative example 6 | 7 | OK (M 1.5) | OK (M 1.5) | OK (M 1.5) | N.G (M 3.0) | OK (M 2.0) |

※ M grade is an indication of the adhesion results, and a value of M 2.5 or less corresponds to a target value.

(The larger the number behind a letter 'M', the wider it is for the paint film to be detached from specimen after the adhesion test

What is claimed is:

1. A bio-paint composition comprising:
   a biomass polyurethane;
   at least one acrylic resin; and
   an additive,
   wherein the at least one acrylic resin comprises a first acrylic resin having a hydroxyl content of 2% to 3% and a glass transition temperature of 85° C. to 90° C.; and a second acrylic resin having a hydroxyl content of 3% to 4% and a glass transition temperature of 80° C. to 85° C., wherein the first acrylic resin and second acrylic resin are not the same resin.

2. The bio-paint composition according to claim 1, wherein the biomass polyurethane has a weight average molecular weight of 40,000 g/mol to 43,000 g/mol, a hydroxyl value of 100 mg KOH/g to 200 mg KOH/g, a hydroxyl content of 6% to 8%, and a glass transition temperature of −32° C. to 30° C.

3. The bio-paint composition according to claim 1, wherein the at least one acrylic resin has an acid value of 0.05 mg KOH/g or less.

4. The bio-paint composition according to claim 1, wherein the at least one acrylic resin is prepared by radical at least one monomer of methacrylic monomers having aliphatic groups, acrylic monomers having aliphatic groups, acrylic monomers having aromatic groups, methacrylic monomers having alicyclic groups, acrylic monomers having alicyclic groups, acrylic monomers having hydroxyl groups, or methacrylic monomers having hydroxyl groups; and a radical initiator in a solvent.

5. The bio-paint composition according to claim 4, wherein each of the methacrylic monomers having the aliphatic groups comprises one selected from the group consisting of butyl methacrylate, methyl methacrylate, ethyl methacrylate, 2-ethylhexyl methacrylate, lauryl methacrylate, hydroxyethyl methacrylate, and combinations thereof,
   each of the acrylic monomers having the aliphatic groups comprises one selected from the group consisting of butyl acrylate, ethyl acrylate, and combinations thereof,
   each of the acrylic monomers having the alicyclic groups comprises one selected from the group consisting of 2-ethylhexyl acrylate, iso-bornyl acrylate, trimethyl cyclohexyl acrylate, and combinations thereof,
   each of the methacrylic monomers having the alicyclic groups comprises one selected from the group consisting of iso-bornyl methacrylate, cyclohexyl methacrylate, and combinations thereof,
   each of the acrylic monomers having the aromatic groups comprises a styrene monomer, and
   each of the methacrylic monomers having the hydroxyl groups comprises one selected from the group consisting of methacrylic acid, acrylic acid, 2-hydroxyethyl methacrylate, and combinations thereof.

6. The bio-paint composition according to claim 1, wherein the first acrylic resin comprises a compound represented by Formula 1:

[Formula 1]

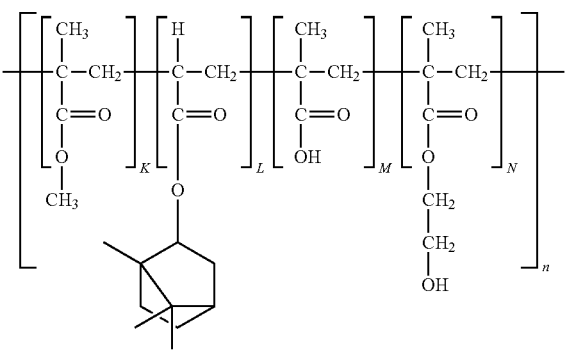

wherein each of K, L, M and N indicates an integer between 0 and 10, and n indicates an integer of 1 or greater.

7. The bio-paint composition according to claim 1, wherein the second acrylic resin comprises a compound represented by Formula 2:

[Formula 2]

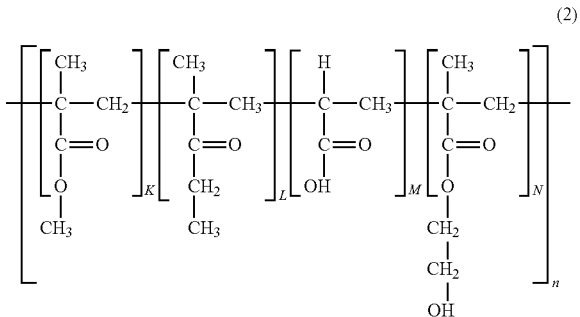

(2)

wherein each of K, L, M and N indicates an integer between 0 and 10, and n indicates an integer of 1 or greater.

8. The bio-paint composition according to claim 1, wherein the additive comprises one selected from the group consisting of reaction catalysts, quenchers, anti-settling agents, wetting additives, UV absorbers, solvents, pigments, and combinations thereof.

9. The bio-paint composition according to claim 1, wherein the additive comprises reaction catalysts, quenchers, anti-settling agents, wetting additives, UV absorbers, solvents, and pigments.

10. The bio-paint composition according to claim 1, comprising:
15 to 25% by weight of the biomass polyurethane;
30 to 60% by weight of the acrylic resin; and
19 to 47% by weight of the additive.

11. The bio-paint composition according to claim 1, comprising:
15 to 25% by weight of the biomass polyurethane;
25 to 45% by weight of the first acrylic resin;
5 to 15% by weight of the second acrylic resin; and
19 to 47% by weight of the additive.

12. The bio-paint composition according to 9, comprising:
15 to 25% by weight of the biomass polyurethane;
25 to 45% by weight of the first acrylic resin;
5 to 15% by weight of the second acrylic resin;
1 to 2% by weight of the pigments;
0.1 to 1.5% by weight of the reaction catalysts;
1.5 to 3.5% by weight of the quenchers;
5.0 to 10.0% by weight of the anti-settling agents;
0.1 to 0.5% by weight of the wetting additives;
1.0 to 2.0% by weight of the UV absorbers; and
10 to 25% by weight of the solvents.

13. A method of preparing a bio-paint composition, the method comprising:
preparing at least one acrylic resin;
preparing a biomass polyurethane; and
mixing the at least one acrylic resin, the biomass polyurethane, and an additive to produce the bio-paint composition,
wherein the at least one acrylic resin comprises a first acrylic resin having a hydroxyl content of 2% to 3% and a glass transition temperature of 85° C. to 90° C., and a second acrylic resin having a hydroxyl content of 3% to 4% and a glass transition temperature of 80° C. to 85° C., wherein the first acrylic resin and second acrylic resin are not the same resin.

14. The method according to claim 13, wherein the preparing of the biomass polyurethane comprises preparing a mixed solution by adding the at least one acrylic resin and isocyanate to an organic solvent; and synthesizing the biomass polyurethane by adding bio polyols to the mixed solution.

15. The method according to claim 13, wherein the first acrylic resin is prepared by adding a methacrylic monomer having an aliphatic group, an acrylic monomer having an alicyclic group, and a methacrylic monomer having a hydroxyl group, and a radical initiator in a solvent and by radical polymerizing the added components.

16. The method according to claim 15, wherein the first monomer comprises methyl methacrylate, iso-bornyl acrylate, methacrylic acid and 2-hydroxyethyl methacrylate.

17. The method according to claim 13, wherein the second acrylic resin is prepared by adding a methacrylic monomer having an aliphatic group, a methacrylic monomer having a hydroxyl group, and an acrylic monomer having a hydroxyl group, and a radical initiator to a solvent and by radical polymerizing the added components.

18. The method according to claim 13, wherein the second monomer comprises methyl methacrylate, ethyl methacrylate, acrylic acid, and 2-hydroxyethyl methacrylate.

* * * * *